(No Model.)

T. J. FORSHEE.
CUTTING APPARATUS FOR MOWERS AND REAPERS.

No. 350,456. Patented Oct. 5, 1886.

Fig. 3. *Position when in use.*

Attest:
F. H. Schott
Chas. J. Stockman

Inventor:
Thomas J. Forshee,
per J. C. Tasker atty

UNITED STATES PATENT OFFICE.

THOMAS J. FORSHEE, OF BROWNSBURG, INDIANA.

CUTTING APPARATUS FOR MOWERS AND REAPERS.

SPECIFICATION forming part of Letters Patent No. 350,456, dated October 5, 1886.

Application filed June 27, 1885. Serial No. 170,048. (No model.)

*To all whom it may concern:*

Be it known that I, THOMAS J. FORSHEE, a citizen of the United States, residing at Brownsburg, in the county of Hendricks and State of Indiana, have invented certain new and useful Improvements in Cutting Apparatus for Mowers and Reapers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in the cutting apparatus of mowers, reapers, and other harvesting-machines; and it consists of an improved construction and arrangement of the knife or sickle, guard-fingers, finger-bar, and other parts, as will be hereinafter fully described and claimed.

Figure 1:
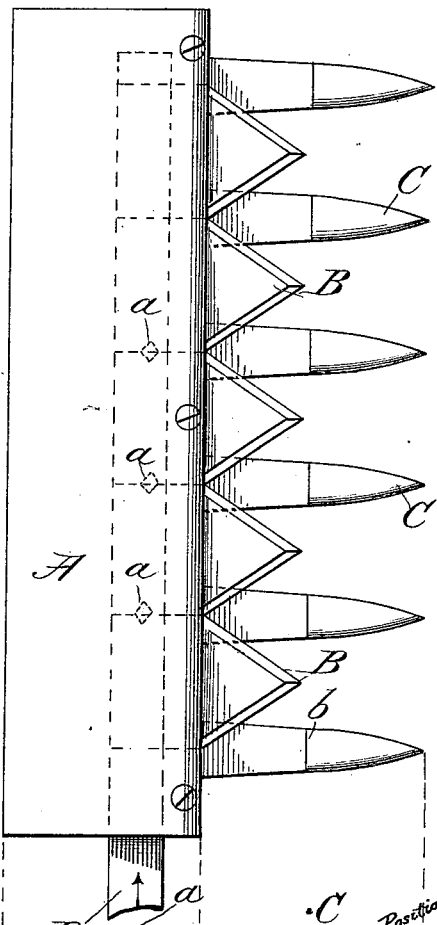
Figure 2:
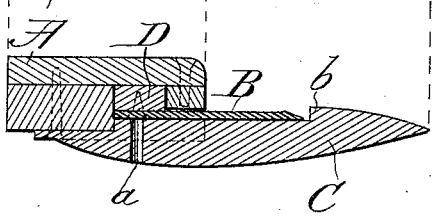
Figure 2:
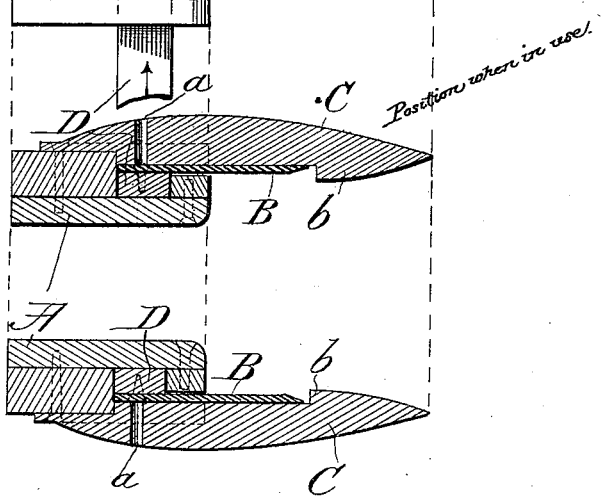

In the annexed drawings, illustrating this invention, Figure 1 is a bottom plan view of a portion of the finger-bar of a harvesting-machine, showing the fingers and knife-teeth. Fig. 2 is a transverse section of the same, and Fig. 3 is a similar transverse section of the bar in its operative position.

Like letters designate like parts in all the views.

A represents a finger-bar made of several pieces, as shown in Fig. 2, in such manner as to leave a rectangular groove for the insertion of the sickle-bar or bar carrying the knives; but, evidently, my bar may be made in one piece, and thus avoid the trouble of securing the parts together. In either case, however, a rectangular groove must be left, as this constitutes one of the features of my invention.

Upon the bar A are fastened the single fingers C C by any usual and suitable means. These fingers C C are constructed of a form shown more clearly in Fig. 2, the most important feature of this construction being that the part which I have designated by the letter *b* is left open, and is not extended over the knife to form a covering therefor, as is so common in harvesters at present. Thus the knife-blades are covered during no part of their movement, but slide open and free upon these open fingers, their point passing close to the projecting part *b*, but not passing under any covering-shield. This I find to be a great advantage, as the machine cannot clog or choke, because there is nothing for the grass or grain to get into to cause it to choke. In other mowing-machines wherein the guard-finger is constructed of another form, the grass and the trash of the field are liable to be drawn in between the guards and choke the machine, so that it is necessary to stop it in order to remove the offending material; and, further, no advantage to be derived from the use of a closed or covered finger is lost by using my improved finger, because with the latter the grass will be cut just as completely and easily, and one kind of grass or grain as well as another. Between these single guard-fingers are formed perforations *a a*, for convenience in oiling the cutter-bar, and these perforations may also be made through the fingers themselves; also, the guard-fingers are fastened to the top instead of to the under side of the bar. The sickle-bar D is made rectangular in shape, so as to conform to the shape and size of the groove within the finger-bar provided for its reception. The portion of said finger-bar which forms the side of the groove toward the fingers or front of the device is made of less thickness than the corresponding portion on the other side, in order that the knives may project through the interspace and slide easily between the finger-bar and the shank of the fingers. These knives or cutters are fastened firmly by bolts or rivets to the sickle-bar, and they are ground upon the bottom instead of on the top, as is usual with other cutters.

The inverted knives, in combination with the cutter-bar which I have described and shown, form a cutting mechanism which is productive of the very best results.

Having thus described my invention, what I claim as new, and desire to secure by Letters Patent, is—

In a mower or reaper, a cutting mechanism consisting of the rectangularly-grooved finger-bar A, the open guard-fingers C C, provided with oil-holes $a\ a$, and having projecting portions $b$, and the knife-bar D, carrying cutting-knives B B, beveled on the lower edge, said bar fitting and sliding closely within the groove of the finger-bar, substantially as shown and described.

In testimony whereof I affix my signature in presence of two witnesses.

THOMAS J. FORSHEE.

Witnesses:
JOSEPH M. TOLLE,
SYLVENUS PATTERSON.